(12) United States Patent
Goto

(10) Patent No.: US 7,346,916 B2
(45) Date of Patent: Mar. 18, 2008

(54) DISK CARTRIDGE AND DEVICE TO WHICH DISK CARTRIDGE IS INSERTED

(75) Inventor: Teiyu Goto, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 408 days.

(21) Appl. No.: 10/814,112

(22) Filed: Mar. 30, 2004

(65) Prior Publication Data

US 2004/0228223 A1    Nov. 18, 2004

(30) Foreign Application Priority Data

May 12, 2003  (JP)  ............................. 2003-133751
Dec. 5, 2003  (JP)  ............................. 2003-406828

(51) Int. Cl.
G11B 23/03  (2006.01)
G11B 17/04  (2006.01)
G11B 7/085  (2006.01)

(52) U.S. Cl. ..................................... 720/738
(58) Field of Classification Search ............... 720/729, 720/738

See application file for complete search history.

(56) References Cited

U.S. PATENT DOCUMENTS

| | | | | |
|---|---|---|---|---|
| 2,316,815 A | * | 4/1943 | Sears ........................... | 40/340 |
| 3,697,084 A | * | 10/1972 | Ban ......................... | 360/78.03 |
| 4,443,874 A | * | 4/1984 | Steenberg ................... | 720/738 |
| 4,814,924 A | * | 3/1989 | Ozeki ......................... | 360/133 |
| 5,159,182 A | * | 10/1992 | Eisele ......................... | 235/492 |
| 5,163,037 A | * | 11/1992 | Ohmori et al. ............. | 720/631 |
| 5,481,420 A | * | 1/1996 | Cardona et al. ......... | 360/99.06 |
| 5,745,102 A | * | 4/1998 | Bloch et al. ................ | 345/530 |
| 5,986,992 A | * | 11/1999 | Bardmesser ................ | 720/652 |
| 5,995,346 A | * | 11/1999 | Schick et al. ............... | 360/133 |
| 6,111,726 A | * | 8/2000 | Clark et al. ................. | 360/133 |
| 6,205,116 B1 | | 3/2001 | Hashimoto | |

(Continued)

FOREIGN PATENT DOCUMENTS

EP    0 933 772    8/1999

(Continued)

OTHER PUBLICATIONS

Partial European Search Report dated Sep. 10, 2007, from the Corresponding European Application.

*Primary Examiner*—Angel Castro
*Assistant Examiner*—Christopher R. Magee
(74) *Attorney, Agent, or Firm*—Katten Muchin Rosenman LLP

(57) ABSTRACT

A disk cartridge, which is easy to handle, is provided. The disk cartridge includes a cartridge main body having: an opening facing a disk; and a shutter for opening and closing the opening. A part of the cartridge main body is formed in an approximately semicircular shape. Such a shape allows a user to easily know an insertion direction. Moreover, since the cartridge main body does not have any corners, the insertion into a drive device is simplified. The shutter is provided pivotably for the cartridge main body. Any one of a plurality of types of medium can be provided in the disk cartridge. When the disk cartridge is inserted into an external device such as the drive device, the device receives a signal indicating the type of medium, which is transmitted through an electric terminal, so as to perform a process in accordance with the type of medium.

10 Claims, 3 Drawing Sheets

U.S. PATENT DOCUMENTS

| | | | |
|---|---|---|---|
| 6,274,844 B1 * | 8/2001 | Beuch et al. | 219/121.64 |
| 6,298,016 B1 * | 10/2001 | Otsuka | 369/14 |
| 6,340,117 B1 * | 1/2002 | Eisele et al. | 235/492 |
| 6,356,527 B1 * | 3/2002 | Shiomi et al. | 720/738 |
| 6,385,004 B1 * | 5/2002 | Sanpei et al. | 360/96.5 |
| 6,459,677 B1 * | 10/2002 | Shiomi et al. | 720/739 |
| 6,473,392 B2 * | 10/2002 | Shiomi et al. | 720/738 |
| 6,680,817 B1 * | 1/2004 | Kano et al. | 360/132 |
| 6,728,199 B2 * | 4/2004 | Obata et al. | 720/738 |
| 6,826,773 B2 * | 11/2004 | Oishi et al. | 720/739 |
| 6,985,331 B2 * | 1/2006 | Oishi et al. | 360/133 |
| 7,043,744 B2 * | 5/2006 | Choi et al. | 720/729 |
| 2001/0022765 A1 * | 9/2001 | Sanada et al. | 369/75.2 |

FOREIGN PATENT DOCUMENTS

| | | | |
|---|---|---|---|
| EP | 0 936 608 | | 2/2001 |
| JP | 04362530 A | * | 12/1992 |
| JP | 7-6493 | | 1/1995 |
| JP | 09231672 A | * | 9/1997 |
| JP | 10149650 A | * | 6/1998 |
| JP | 11120740 A | * | 4/1999 |

* cited by examiner

DISK CARTRIDGE AND DEVICE TO WHICH DISK CARTRIDGE IS INSERTED

BACKGROUND OF THE INVENTION

1. Field of the Invention

The present invention relates to a disk cartridge and a device to which a disk cartridge is inserted.

2. Description of the Related Art

With the improvement of a recording density of magnetic disks, optical disks, magneto-optical disks and the like, compact recording/reproducing media having a large storage capacity are familiarized. Moreover, with the improvement of processing power of CPUs and the realization of miniaturization of hardwares, portable terminals are also remarkably familiarized. With the familiarization as described above, a recording/reproducing medium is generally housed within a cartridge main body so as to be easily carried. Such a disk cartridge is inserted into a portable terminal to read/write data from/to the recording/reproducing medium.

A conventional disk cartridge normally has a horizontally and vertically symmetrical square shape, as is represented by a FD or an MD (registered trademark). Therefore, when the disk cartridge is inserted into a drive device, it is difficult for a user to immediately recognize an insertion direction of the cartridge from its shape. Thus, the user is first required to confirm an arrow marked on a cartridge main body, which indicates the insertion direction, so as to know from which side the disk cartridge should be inserted. Moreover, since the disk can be reduced in size owing to its higher density, various disk types can now be contemplated as a disk to be housed within the cartridge.

SUMMARY OF THE INVENTION

The present invention was devised in view of the above-described context and has an object of providing a disk cartridge which is easily insertable into a drive device and a drive device to which the disk cartridge is inserted. Moreover, the present invention has another object of providing a disk cartridge having high convenience and an external device to which the disk cartridge is inserted.

One aspect of the present invention relates to a disk cartridge including: a cartridge main body; and a round plate-shaped disk rotatably housed within the cartridge main body. In the disk cartridge according to this aspect, the cartridge main body includes: an opening facing the disk; and a shutter for opening and closing the opening, wherein a part of the cartridge main body is formed in an approximately semicircular shape. The cartridge main body is formed of a combination of an approximately semicircular shaped part and a remaining part in a shape other than an approximately semicircular shape, instead of being formed in a horizontally and vertically symmetrical square shape. As a result, if a user merely sees the planar shape of the disk cartridge, the user can easily know an insertion direction of the disk cartridge into the drive device.

Another aspect of the present invention relates to a drive device to which the disk cartridge is inserted. The drive device according to this aspect includes a mechanism which is engaged with a projecting portion of a shutter, the projecting portion protruding toward a groove formed in the cartridge main body, so as to turn the shutter to open it when the disk cartridge is inserted.

A further aspect of the present invention provides a disk cartridge including: a cartridge main body; and a medium housed within the cartridge main body, wherein the cartridge main body includes an electric terminal which transmits or receives an electronic signal to or from an external device, so as to transmit the electronic signal indicating the type of medium from the electric terminal to the external device.

A further another aspect of the present invention provides a device to which a disk cartridge is inserted, which receives an electronic signal indicating the type of a medium housed within the disk cartridge from an electric terminal of the disk cartridge inserted thereinto so as to specify the type of the medium.

This summary of the invention does not necessarily describe all necessary features so that the invention may also be a sub-combination of these described features.

DETAILED DESCRIPTION OF THE INVENTION

First Embodiment

Figure 1:
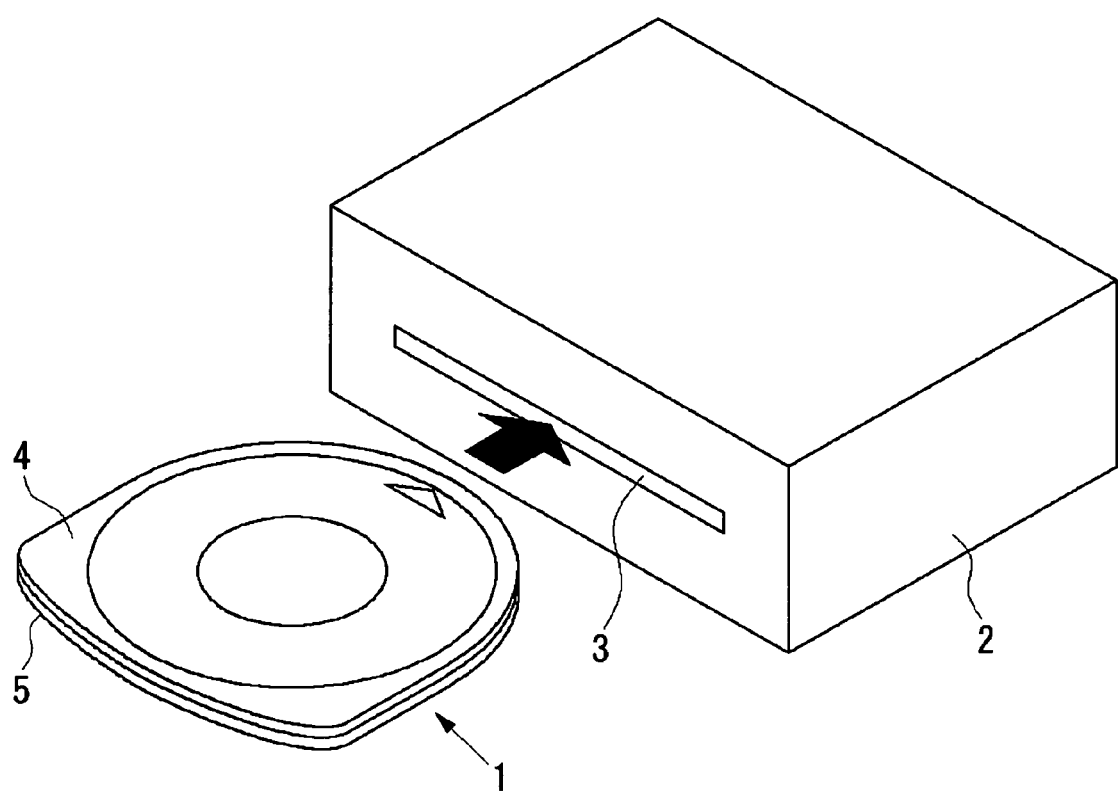
FIG. 1 is a diagram showing a disk cartridge according to an embodiment of the present invention and a drive device of the disk cartridge.

FIG. 1 shows a disk cartridge 1 according to a first embodiment of the present invention and a drive device 2 of the disk cartridge 1. The disk cartridge 1 is inserted into the drive device 2 through an insertion slot 3 along a guide portion (not shown) provided inside the drive device 2. The disk cartridge 1 includes a cartridge main body composed of an upper case 4 and a lower case 5. A round plate-shaped disk is rotatably housed within the cartridge main body. The lower case 5 of the cartridge main body includes: an opening facing the disk; and a shutter for opening and closing the opening. The drive device 2 opens the shutter so that the disk cartridge 1 is inserted. Then, the drive device 2 drives to rotate the disk housed within the disk cartridge 1 so as to read or write disk data through the opening. The drive device 2 may be a personal computer or a game device having the processing function such as a CPU, and may be an installation type terminal or a portable terminal.

Figure 2A:
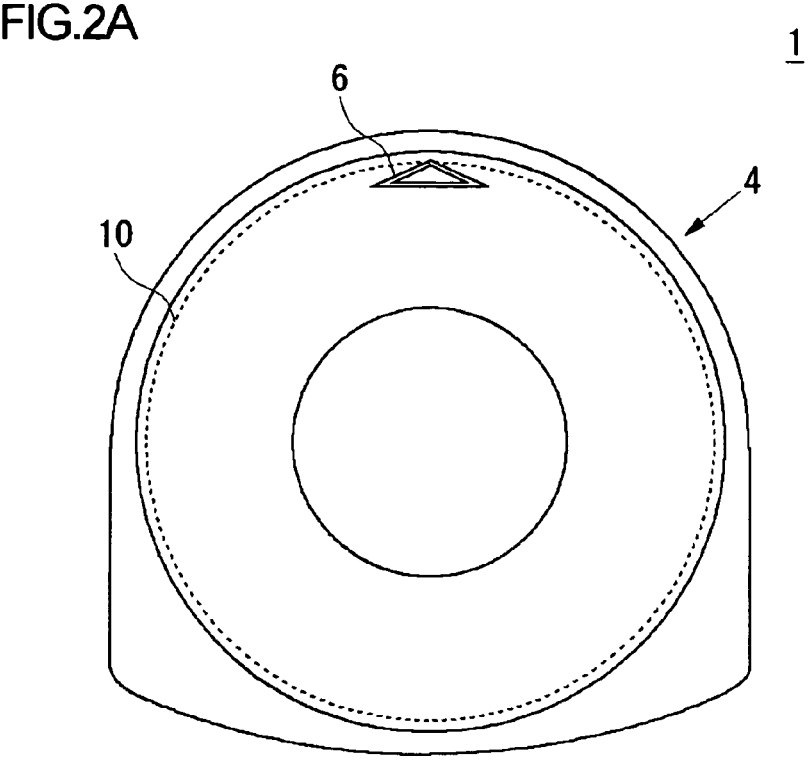
FIG. 2A is a top view of the disk cartridge.
Figure 2B:
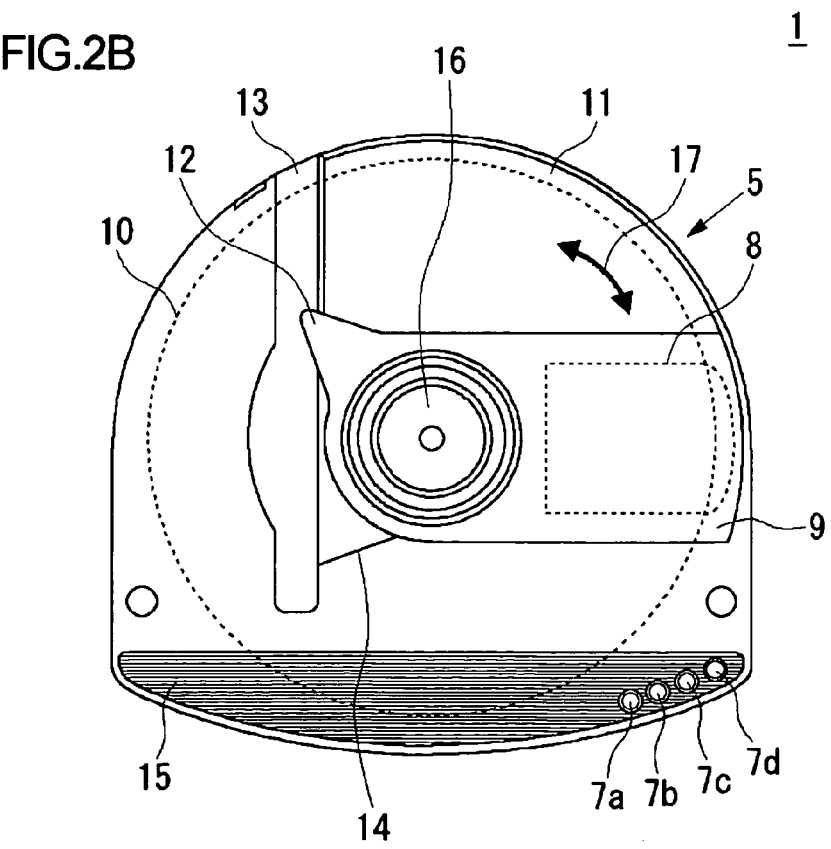
FIG. 2B is a bottom view of the disk cartridge.

FIG. 2A is a top view of the disk cartridge 1, illustrating the upper case 4 of the disk cartridge 1. On the upper case 4, an arrow 6 indicating an insertion direction of the disk cartridge 1 into the drive device 2 is marked. FIG. 2B is a bottom view of the disk cartridge 1, illustrating the lower case 5 of the disk cartridge 1. The cartridge main body is formed by fitting the upper case 4 and the lower case 5 to each other. A round plate-shaped disk 10 is rotatably placed within the cartridge main body.

In this embodiment, a part of the cartridge main body is formed in an approximately semicircular shape. More specifically, a forward region of the cartridge main body in the insertion direction of the disk cartridge 1 to the drive device 2 is formed in an approximately semicircular shape, whereas the remaining part is formed in a shape other than a semicircle. Hereinafter, a part formed in a semicircular shape is referred to as a "forward region," whereas the remaining part is referred to as a "backward region." In the backward region of the lower case 5, a grip part 15 to be gripped by a user when the disk cartridge is removed or inserted is provided. On the grip part 15, linear concave and convex portions for slip-proof are formed.

A user can know the insertion direction of the disk cartridge 1 by confirming the arrow 6 indicating the insertion direction. However, if only the user sees the shape of the cartridge main body, which is formed asymmetric in the insertion direction, that is, in the vertical direction, the user can easily know the insertion direction of the disk cartridge 1. Moreover, the forward region of the cartridge main body is formed in conformity with the shape of the disk 10, so that the material cost of the cartridge main body can be reduced as compared with a conventional case where the cartridge main body is formed in a rectangular shape. Furthermore, for the cartridge main body having a rectangular shape, it is necessary to accurately align the cartridge main body with the guide portion of the drive device 2 so as to prevent the corners of the front part from obstructively contacting the guide portion before insertion. On the other hand, since the disk cartridge 1 according to this embodiment does not have any corners which may otherwise obstructively contact the guide portion at the insertion owing to its semicircular forward region, smooth insertion of the disk cartridge 1 to the guide portion is made possible.

A plurality of electric terminals 7a through 7d (hereinafter, collectively referred to as electric terminals 7) are provided on the lower case 5. The electric terminals 7 are formed in a region other than the approximately semicircular region, that is, in the backward region. As a result, electronic equipment, for example, a flash memory to be connected to the electric terminals 7 can be provided in the backward region. If the disk 10 is a ROM for games, the drive device 2 can record save data of the games and the like onto a memory through the electric terminals 7. The backward region is formed in a shape other than the approximately semicircular shape to leave some room in view of the space. Therefore, the electric terminals 7 are provided so as to allow electronic equipment to be included therein, thereby realizing the effective use of the space.

The lower case 5 exposes a driven part 16 of the disk 10 in its approximate center. Upon insertion of the disk cartridge 1, the drive device 2 makes a drive motor (not shown) abut against the driven part 16 so as to drive to rotate the disk 10, thereby reading/writing data from/to an arbitrary region of the disk 10.

The lower case 5 includes: an opening 8 facing the disk 10; and a shutter 9 for opening and closing the opening 8. The shutter 9 is provided pivotable in a direction indicated with an arrow 17 around the approximate center of the cartridge main body as the center of rotation. The axis of rotation of the shutter 9 is identical with that of the disk 10. Since the axis of rotation of the shutter 9 is shared by the disk 10, a mechanically simple structure can be achieved. The shutter 9 pivots within a concave portion 11 formed in a circular arc shape. A stopper 14 is formed in the concave portion 11 so as to restrict the rotation of a projecting portion 12. The lower case 5 further includes a groove 13 formed in a direction in which the disk cartridge 1 is inserted into the drive device 2, the groove 13 having an end at a part of a circumferential portion of the forward region formed in an approximately semicircular shape. The shutter 9 is formed to have the projecting portion 12 which protrudes toward the groove 13. The projecting portion 12 is engaged with a shutter opening/closing mechanism of the drive device 2 at the insertion of the disk cartridge 1 into the drive device 2 to be pushed in a direction opposite to the insertion direction. As a result, the projecting portion 12 turns the shutter 9 to expose the opening 8.

Figure 3A:
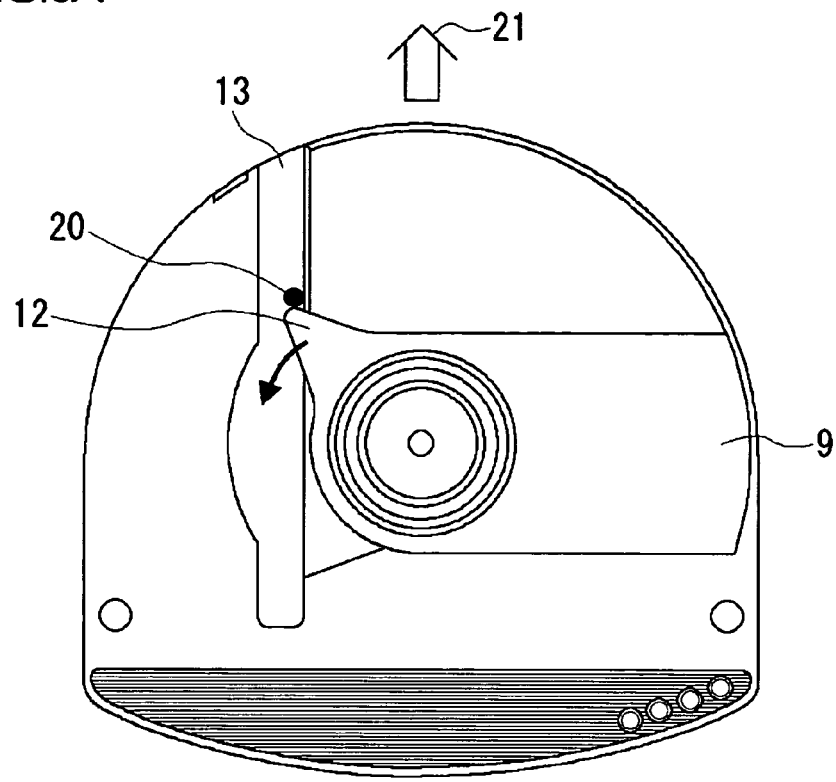
FIG. 3A is a diagram showing a state where a shutter opening/closing mechanism of the drive device is engaged with a projecting portion of a shutter.

FIG. 3A shows a state where a shutter opening/closing mechanism of the drive device 2 is engaged with the projecting portion 12 of the shutter 9. As shown in FIG. 3A, when the disk cartridge 1 is inserted into the drive device 2 in the direction indicated with an arrow 21, the shutter opening/closing mechanism 20 provided inside the drive device 2 travels in the groove 13 in a relatively opposite direction to the arrow 21 so as to abut against the projecting portion 12 of the shutter 9.

Figure 3B:
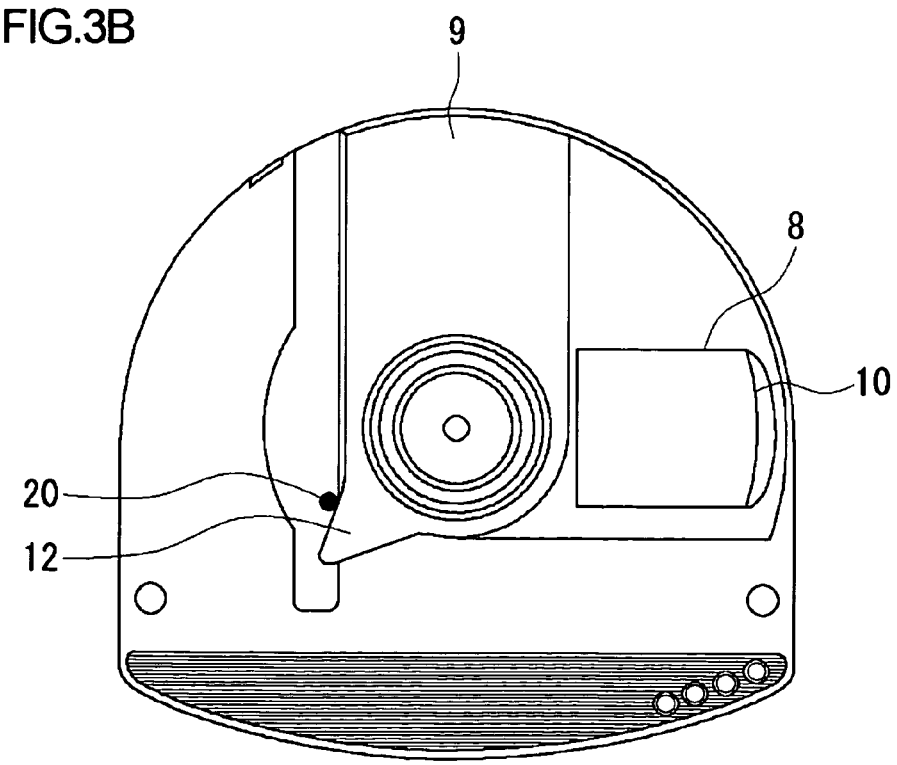
FIG. 3B is a diagram showing a state where the shutter of the disk cartridge opens.

FIG. 3B shows a state where the shutter 9 of the disk cartridge 1 opens. When the disk cartridge 1 is inserted into the drive device 2, the shutter opening/closing mechanism 20 allows the projecting portion 12 of the shutter 9 to move in a relatively opposite direction to the insertion direction so as to turn the shutter 9 at almost 90 degrees. As a result, the opening 8 is exposed to allow the drive device 2 to read/write data through the opening 8 from/to the disk 10.

Second Embodiment

As in the first embodiment, a second embodiment relates to the disk cartridge 1 including: the cartridge main body; and a medium housed within the cartridge main body. In the second embodiment, a medium to be housed within the cartridge main body can be selected from a plurality of types of medium. For example, a medium to be housed may be an optical recording medium or a magnetic recording medium. Furthermore, the medium may be a tuner device such as a TV tuner or GPS tuner or a recording device such as a hard disk drive device or a flash memory. The optical recording medium or the magnetic recording medium is formed as a round plate-shaped disk so as to be rotatable. On the other hand, for example, the tuner device may be formed in a round-plate shape or in the other shapes.

In the disk cartridge 1 according to the second embodiment, the electric terminals 7 shown in FIG. 2B act as connection terminals for transmitting/receiving an electronic signal to/from an external device. In the first embodiment, the electric terminals 7 are provided in the region where the disk 10 is not present so that electronic equipment such as a flash memory is provided. However, the position of the electric terminals 7 is not limited thereto; the electric terminals 7 may be provided in a part where a medium such as the disk 10 is present. The electric terminals 7 may also be provided on an end face of the disk cartridge 1.

The electric terminals 7 provided for the disk cartridge 1 transmit an electronic signal indicating the type of medium to an external device. The electric terminal 7 for transmitting an electronic signal may be predefined, for example, to be the electric terminal 7a provided at the extremity of the electric terminals 7. The electronic signal may contain a format of a medium (data format) as well as the type of medium. The external device in this embodiment may be the drive device 2 as shown in FIG. 1. However, the disk cartridge 1 in the second embodiment may include a CPU, a medium driving mechanism and the like so as to also serve as a drive device for controlling input/output of data to/from the medium. Since the drive device varies depending on the type of medium, if a structure for reading/writing data from/to the medium is provided within the disk cartridge 1, a structure of the external device, into which the disk cartridge 1 is inserted, can be simplified thereby.

The external device such as the drive device 2 receives an electronic signal indicating the type of medium housed within the disk cartridge 1 from the electric terminals 7 of the disk cartridge 1 inserted therein so as to specify the type of medium. For example, if it is determined that a medium housed within the disk cartridge 1 is an optical, magneto-optical, or magnetic disk, information is read/written by a pickup device or a magnetic head provided for the drive device 2. On the other hand, if it is determined that the medium is a tuner device or a recording device, information is communicated through the electric terminals 7 by a protocol in accordance with the device. As a result, the external device is capable of executing a process in accordance with the type of medium. The external device is configured to have a monitor or a speaker. For example, when a tuner device is inserted, the external device may activate an application for TV so as to function as a TV. When an optical disk or the like is inserted, the external device may activate a software in accordance with data recorded onto the disk so as to function as a game device or an audio reproducer. By using a single external device as a processing device for a plurality of types of medium, user utility can be enhanced. The external device can perform communication through the external terminals 7 of the disk cartridge 1. Moreover, the external device can perform expected control by using a medium. The external device may supply driving electric power to the disk cartridge 1 through the electric terminals 7.

Although the disk cartridge 1 has the shutter 9 as described in the first embodiment, the opening/closing operations of the shutter 9 can be utilized as a switch. For example, when the shutter 9 opens upon insertion of the disk cartridge 1, the opening operation of the shutter 9 may used as a trigger so as to supply electric power to electronic equipment such as a CPU included in the disk cartridge 1 or to initialize the device.

The present invention has been described based on the embodiments. It will be understood by those skilled in the art that the above embodiments are merely exemplary and various modifications are possible in each of the components without departing from the scope of the invention. For example, although the axis of rotation of the shutter 9 is identical with that of the disk 10 in the above embodiment, the axis of rotation of the shutter 9 and that of the disk 10 may be formed separately in view of design in an alternative embodiment.

What is claimed is:

1. A disk cartridge, comprising:
a cartridge main body; and
a round plate-shaped disk rotatably housed within the cartridge main body,
wherein the cartridge main body includes an opening facing the disk and a shutter which opens and closes the opening,
wherein a part of the cartridge main body is formed in an approximately semicircular shape,
wherein the cartridge main body includes an electric terminal adapted to electrically couple the disk cartridge and a drive device when the disk cartridge is inserted in the drive device,
wherein the drive device receives an electrical signal indicating the type of medium from the disk cartridge, and
wherein the drive device executes a process in accordance with the type of medium.

2. The disk cartridge according to claim 1, wherein
the cartridge main body has the electric terminal in a region other than a region in the approximately semicircular shape.

3. The disk cartridge according to claim 1, wherein
the shutter has the same axis of rotation as that of the disk and is pivotably provided for the cartridge main body.

4. The disk cartridge according to claim 2, wherein
the shutter has the same axis of rotation as that of the disk and is pivotably provided for the cartridge main body.

5. The disk cartridge according to claim 1, wherein
the cartridge main body has a groove formed in a direction in which the disk cartridge is inserted into the drive device, the groove having an end at a part of a circumferential portion of the region in the approximately semicircular shape; and
the shutter has a projecting portion protruding toward the groove.

6. The disk cartridge according to claim 2, wherein
the cartridge main body has a groove formed in a direction in which the disk cartridge is inserted into the drive device, the groove having an end at a part of a circumferential portion of the region in the approximately semicircular shape; and
the shutter has a projecting portion protruding toward the groove.

7. The disk cartridge according to claim 3, wherein
the cartridge main body has a groove formed in a direction in which the disk cartridge is inserted into the drive device, the groove having an end at a part of a circumferential portion of the region in the approximately semicircular shape; and
the shutter has a projecting portion protruding toward the groove.

8. The disk cartridge according to claim 4, wherein
the cartridge main body has a groove formed in a direction in which the disk cartridge is inserted into the drive device, the groove having an end at a part of a circumferential portion of the region in the approximately semicircular shape; and
the shutter has a projecting portion protruding toward the groove.

9. A disk cartridge, comprising
a cartridge main body; and
a medium housed within the cartridge main body, wherein
the cartridge main body includes an electric terminal which transmits an electronic signal to an external device, so as to transmit the electronic signal indicating the type of the medium from the electric terminal to the external device.

10. The disk cartridge according to claim 9, wherein
a drive device which controls input/output of data to/from the medium is incorporated in the cartridge main body.

* * * * *